United States Patent
Marchini et al.

(10) Patent No.: US 12,454,908 B2
(45) Date of Patent: Oct. 28, 2025

(54) HOT EXHAUST GAS ENERGY RECOVERY SYSTEM

(71) Applicant: Aruanã Energia S.A., Goiania (BR)

(72) Inventors: Sandro Marchini, São Paulo (BR); Brian Ray Brewer, São Paulo (BR); Robert James McKinnon, São Paulo (BR)

(*) Notice: Subject to any disclaimer, the term of this patent is extended or adjusted under 35 U.S.C. 154(b) by 0 days.

(21) Appl. No.: 18/454,210

(22) Filed: Aug. 23, 2023

(65) Prior Publication Data
US 2024/0068398 A1 Feb. 29, 2024

(30) Foreign Application Priority Data
Aug. 23, 2022 (BR) .......................... 102022016812-1

(51) Int. Cl.
*F02B 63/04* (2006.01)
*F02B 37/00* (2006.01)
(Continued)

(52) U.S. Cl.
CPC ............ *F02B 63/04* (2013.01); *F02B 37/005* (2013.01); *F02B 37/10* (2013.01); *F02B 39/08* (2013.01);
(Continued)

(58) Field of Classification Search
CPC ........ F02B 63/04; F02B 67/08; F02B 37/005; F02B 37/10; F02B 39/08; F02B 6/12; F02B 6/14; F05D 2220/62; F05D 2220/76; F05D 2260/4021; F05D 2260/406; F05D 2260/42
See application file for complete search history.

(56) References Cited

U.S. PATENT DOCUMENTS

| | | | | |
|---|---|---|---|---|
| 4,083,188 A | * | 4/1978 | Kumm | ................... F02B 37/10 60/605.1 |
| 4,729,225 A | * | 3/1988 | Bucher | ................ F02B 37/005 60/717 |

(Continued)

FOREIGN PATENT DOCUMENTS

CN 110953763 A 4/2020

*Primary Examiner* — Loren C Edwards
(74) *Attorney, Agent, or Firm* — Cowan, Liebowitz & Latman, P.C.; Anastasia Zhadina

(57) ABSTRACT

The present invention relates to the field of energy recovery from hot exhaust gases, a type of system that is widely used in industrial generator assemblies to produce steam used in industrial processes or cold to cool perishables or to cool environments. The system according to the present invention applies to the recovery of energy from exhaust gases in small generator assemblies, smaller than 10 MW, and comprises a turbo (1) connected to the exhaust gas outlet (2) in a small power plant generator assembly (3) and in which said turbo (1) is connected to a hydraulic pump (4), which generates pressure and transmits this pressure to a hydraulic pressure accumulator (5) which, in turn, sends hydraulic fluid under pressure for a hydraulic motor (6) of constant speed, which moves a pulley (7), and said pulley (7), in turn, moves another pulley (8), installed directly on the alternator shaft (9) of the generator assembly (3). In addition to pulleys (7,8), the movement can be done through a gear/clutch system or through a torque converter.

7 Claims, 1 Drawing Sheet

(51) Int. Cl.
  *F02B 37/10* (2006.01)
  *F02B 39/08* (2006.01)
  *F02B 67/08* (2006.01)
  *F02C 6/12* (2006.01)
  *F02C 6/14* (2006.01)

(52) U.S. Cl.
  CPC ............... *F02B 67/08* (2013.01); *F02C 6/12* (2013.01); *F02C 6/14* (2013.01); *F05D 2220/62* (2013.01); *F05D 2220/76* (2013.01); *F05D 2260/4021* (2013.01); *F05D 2260/406* (2013.01); *F05D 2260/42* (2013.01)

(56) References Cited

U.S. PATENT DOCUMENTS 6,162,141 A * 12/2000 Rointru ................. F16H 7/1209
                                                    474/190
7,640,643 B2    1/2010 Nakhamkin

* cited by examiner

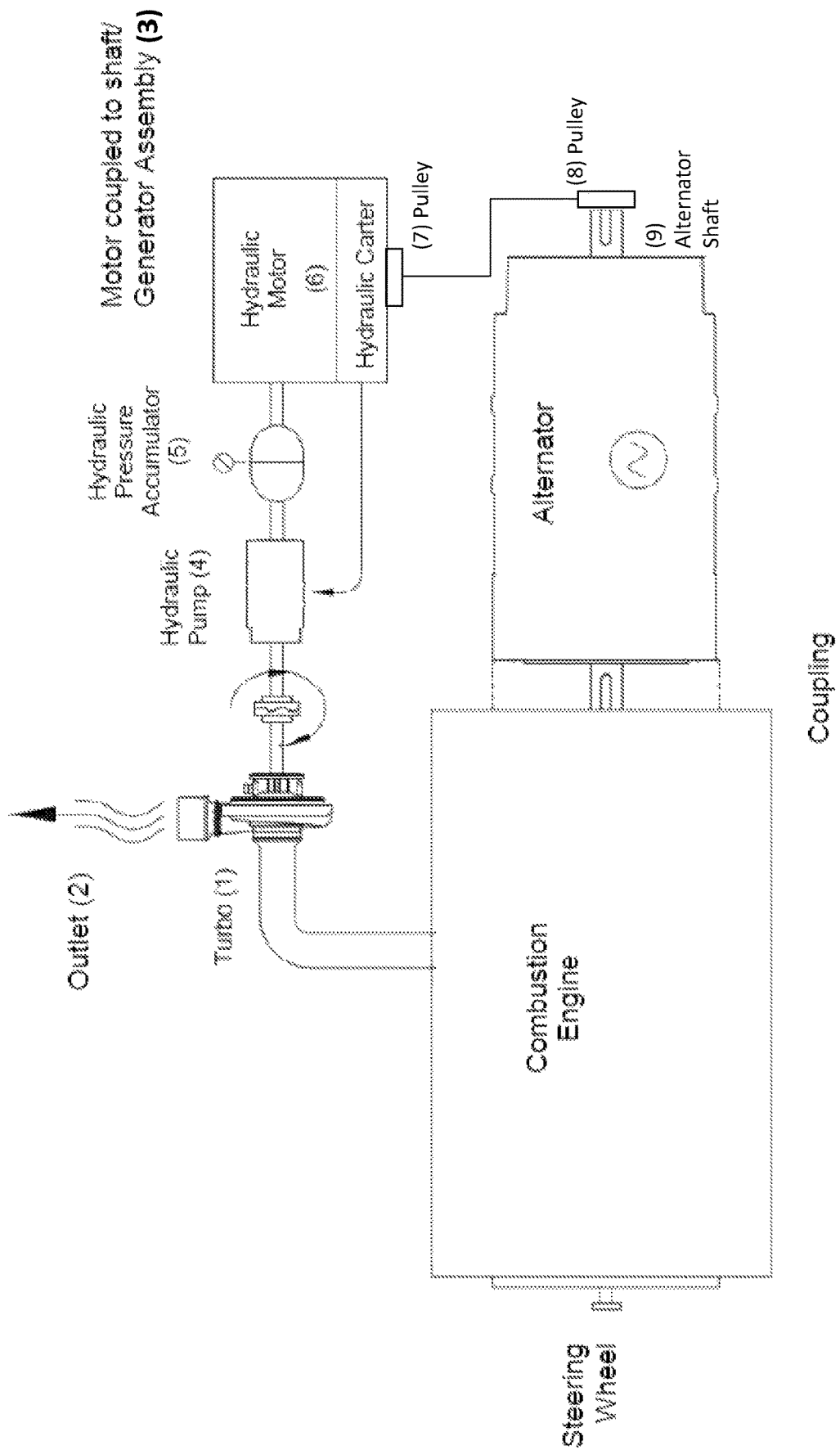

HOT EXHAUST GAS ENERGY RECOVERY SYSTEM

FIELD OF THE INVENTION

The present invention relates to the field of energy recovery from hot exhaust gases, a type of system that is widely used in industrial generator assemblies to produce steam used in industrial processes or cold to cool perishables or to room refrigeration.

BACKGROUND OF THE INVENTION

Conventional turbochargers use the engine's exhaust power to drive a turbocharger exhaust turbine that powers an air compressor that supplies high-pressure combustion air to the engine. For modern motor vehicles, there is a need for higher specific engine power, lower fuel consumption and lower exhaust emissions. These are met with smaller higher speed engines that require high thrust achievable over wide engine speed ranges. A specific need of modern high-speed engines is greater engine torque in the low engine speed range to improve vehicle acceleration. This often results in an excess of engine exhaust energy at higher engine speeds. To avoid turbocharger overspeed and overpressure, a solution found in the state of the art takes advantage of substantial portions of "waste-gating" of the engine exhaust flow, which represents a waste of fuel. Wasted energy exiting the tailpipe in the form of exhaust gas flow is estimated to be up to 20% in compact engines.

Some solutions for using exhaust gases are found in the prior art. Document U.S. Pat. No. 7,640,643, for example, discloses a system applied to a combined cycle (CC) power generation plant in a load management compressed air energy storage (CAES) plant. The DC power plant includes at least one combustion turbine, a heat recovery steam generator (HRSG) to receive exhaust heat from an associated combustion turbine, a steam turbine associated with the HRSG, and an electrical generator associated with the turbine steam. An air storage stores compressed air. At least one compressor supplies compressed air to the air storage so that off-peak energy can be converted into compressed air energy stored in the air storage. Compressed air from storage is received by the HRSG and the HRSG supplies heat to the compressed air received from air storage. The steam turbine takes in heated compressed air from the HRSG and expands the heated compressed air to produce power.

Document CN110953763, on the other hand, discloses a gas-fired combined heat and power generation system and a method for the control thereof. The combined gas heat and power generation system comprises a first compressor, a high temperature boiler, a second compressor, a material storage chamber, a gas engine, a gas turbine device, a generator, a high temperature waste heat recycling device, a low temperature waste heat recycling device, a waste heat boiler and an air preheater. As per the gas combined heat and power system and the method for the control thereof, the function of gas combined heat and power is achieved comprehensively through the high temperature boiler, gas engine, from gas turbine device, generator, high temperature waste heat recycling device, low temperature waste heat recycling device, waste heat boiler and air preheater, comprehensive recycling of electrical energy and thermal energy is achieved, and the energy conversion efficiency of the system can be improved.

The present invention focuses on the recovery of energy from hot exhaust gases, a type of system that is widely used in industrial generator assemblies to produce steam used in industrial processes or cold to cool perishables or to cool environments in a small plant. In larger power plants, consisting of large generator assemblies, the exhaust gases are combined in an energy recovery boiler to produce enough energy to drive a steam turbine capable of producing an additional amount of electrical energy. This type of system, however, is only economically viable in plants composed of many large generator assemblies.

SUMMARY OF THE INVENTION

The present invention aims at recovering energy from hot exhaust gases, a type of system that is widely used in industrial generator assemblies to produce steam used in industrial processes or cold to cool perishables or to refrigerate rooms.

Until now, the recovery of energy from exhaust gases in smaller generator assemblies, smaller than 10 MW, has never been feasible.

BRIEF DESCRIPTION OF THE DRAWINGS

FIG. 1 schematically illustrates the system according to the present invention.

DETAILED DESCRIPTION OF THE INVENTION

In economic terms, the system according to the present invention is viable for plants with smaller generator assemblies.

The system according to the present invention consists of the following basic components:
1. A turbo at the exhaust gas outlet connected with
2. A hydraulic pump that generates pressure and passes it forward
3. A hydraulic pressure accumulator that sends hydraulic oil under pressure to
4. A constant speed hydraulic motor that drives a pulley that moves
5. Another pulley, installed directly on the generator assembly alternator shaft, thus increasing the mechanical power generated from the system and subsequently increasing the total electrical power generated from the generator assembly.

In addition to pulleys, the movement can be done through a gear/clutch system or through a torque converter.

In the system according to the present invention, the low pressure hydraulic oil discharged from the hydraulic pump is drained by an oil tank (6), which works as a pressureless accumulation basin, whose function is to supply the turbo/pump with oil to maintain the hydraulic cycle.

The system according to the present invention can increase the total power generated by the generator assembly by 5-10%, using the same amount of fuel, which is a significant gain in continuous generation plants.

A first preferred embodiment of the present invention can be described with reference to FIG. 1.

FIG. 1 illustrates some of the important features of the present invention, in which a turbo (1) is connected to the exhaust gas outlet (2) in a small generator assembly plant (3). Said turbo (1) is connected to a hydraulic pump (4), which generates pressure and transmits this pressure to a hydraulic pressure accumulator (5) which, in turn, sends hydraulic fluid under pressure to a hydraulic motor (6) of constant speed, which moves a pulley (7).

The pulley (7), in turn, moves another pulley (8), installed directly on the alternator shaft (9) of the generator assembly (3). In this way, the mechanical power generated by the system is increased and, subsequently, the total electrical power generated from the generator assembly (3) is also increased.

In addition to pulleys, the movement of the system according to the present application can be done through a gear/clutch system or through a torque converter.

In the system according to the present invention, the low pressure hydraulic fluid discharged from the hydraulic pump (4) is drained by a fluid tank (10), which works as a pressureless accumulation basin, whose function is to supply the turbo/pump with fluid to maintain the hydraulic cycle.

In the system according to the present invention the hydraulic motor can be connected:

1—On the flywheel,
2—In the coupling between Engine/Alternator, and
3—On the Alternator Shaft.

The rest of the system is all conventional and the system pays for itself quickly. This system is capable of increasing the total power generated by the generator assembly by 5-10%, using the same amount of fuel, which is a significant gain in continuous generation plants.

It is important to point out that the descriptions presented here refer to a preferred embodiment of the present invention and that changes can be made without departing from the spirit of the present invention.

For example, the invention can be applied to a wide variety and sizes of stationary diesel engines as well as motor vehicle engines. Many aspects of prior art documents which have been incorporated by reference herein may be used in connection with the present invention.

For all the above reasons, the scope of the present invention is to be determined by reference to the following claims and not limited by the specific embodiment described in this specification.

LEGEND

In the drawings, the following legend applies to the use of reference numerals:

(1) Turbo
(2) Outlet
(3) Small generator assembly
(4) Hydraulic pump
(5) Hydraulic pressure accumulator
(6) Hydraulic motor
(7) Pulley
(8) Pulley
(9) Alternator shaft

The invention claimed is:

1. A hydraulic turbo compressor system for an internal combustion engine, the hydraulic turbo combustion system comprises:
    a turbo (1) connected to an exhaust gas outlet (2) in the internal combustion engine (3) and wherein:
        said turbo (1) is connected to a hydraulic pump (4),
        the hydraulic pump generates pressure and transmits said pressure directly to a hydraulic pressure accumulator (5),
        the hydraulic pressure accumulator sends hydraulic fluid under pressure directly to a constant speed hydraulic motor (6),
        the constant speed hydraulic motor moves a pulley (7), and
        said pulley (7) moves a second pulley (8), installed directly on an alternator shaft (9) of the internal combustion engine (3).

2. The hydraulic turbo compressor system according to claim 1, wherein:
    a low pressure hydraulic fluid discharged from the hydraulic pump (4) is drained by a fluid tank (10),
    the fluid tank works as a pressureless accumulation basin,
    the fluid tank (10) supplies the hydraulic pump with fluid to maintain a hydraulic cycle.

3. The hydraulic turbo compressor system according to claim 1, wherein, in addition to said pulley (7) and said second pulley (8), a movement of the system can be done through a gear/clutch system or through a torque converter.

4. The hydraulic turbo compressor system according to claim1, wherein the hydraulic turbo compressor system is a continuous generation plant.

5. The hydraulic turbo compressor system according to claim1, wherein the internal combustion engine is a stationary engine.

6. The hydraulic turbo compressor system according to claim 1, wherein operation of the turbo, the hydraulic pump, the hydraulic pressure accumulator and the constant speed hydraulic motor to move the pulley (7) and the second pulley (8) increases total power generated by the internal combustion engine by at least 5%.

7. A generator assembly comprising:
    the hydraulic turbo compressor system in accordance claim 1, and
    the internal combustion engine (3)
    wherein the exhaust gas outlet (2) of the internal combustion engine (3) is connected to the turbo (1).

* * * * *